(12) United States Patent
Sullivan

(10) Patent No.: US 7,010,066 B2
(45) Date of Patent: Mar. 7, 2006

(54) SYSTEM AND METHOD FOR FAST CODE PHASE AND CARRIER FREQUENCY ACQUISITION IN GPS RECEIVER

(75) Inventor: Mark C. Sullivan, Annandale, VA (US)

(73) Assignee: SkyBitz, Inc., Sterling, VA (US)

( * ) Notice: Subject to any disclaimer, the term of this patent is extended or adjusted under 35 U.S.C. 154(b) by 0 days.

(21) Appl. No.: 09/924,542

(22) Filed: Aug. 9, 2001

(65) Prior Publication Data

US 2002/0025011 A1 Feb. 28, 2002

Related U.S. Application Data

(60) Provisional application No. 60/223,973, filed on Aug. 9, 2000.

(51) Int. Cl.
*H03D 1/00* (2006.01)
(52) U.S. Cl. .................................................. 375/343
(58) Field of Classification Search ................ 375/343, 375/316, 340, 326, 341; 701/213; 342/352, 342/356, 358
See application file for complete search history.

(56) References Cited

U.S. PATENT DOCUMENTS

| | | | |
|---|---|---|---|
| 3,063,048 A | 11/1962 | Lehan et al. |
| 3,124,799 A | 3/1964 | Hagedorn et al. |
| 3,172,108 A | 3/1965 | McClure |
| 3,191,176 A | 6/1965 | Guier |
| 3,242,494 A | 3/1966 | Gicca |
| 3,351,943 A | 11/1967 | Bush et al. |
| 3,384,891 A | 5/1968 | Anderson |
| 3,742,498 A | 6/1973 | Dunn |
| 3,806,936 A | 4/1974 | Koster |
| 4,359,733 A | 11/1982 | O'Neill |
| 4,701,934 A | 10/1987 | Jasper |
| 4,751,512 A | 6/1988 | Longaker |
| 4,819,053 A | 4/1989 | Halavais |
| 4,875,221 A | 10/1989 | Mori |
| 4,896,287 A | 1/1990 | O'Donell et al. |

(Continued)

FOREIGN PATENT DOCUMENTS

EP 0488739 A1 6/1992

(Continued)

OTHER PUBLICATIONS

Paul Sitbon, "Platform Location and Data Collection by Satellite Systems, the Eole Experiment", Laboratoire de Meterologie Dynamique, Paris, France, IEEE Transactions on Geoscience Electronics, vol. GE-13, No. 1, Jan. 1975.

(Continued)

*Primary Examiner*—Kevin Burd
(74) *Attorney, Agent, or Firm*—Duane S. Kobayashi

(57) ABSTRACT

A GPS receiver acquires carrier frequency and Gold code phase using short segments of a received GPS signal. In one embodiment, a 1-ms segment of the GPS signal is transformed to the frequency domain. This is multiplied by a frequency representation of the Gold code. The resulting product is converted to the time domain, and a peak is detected. The location of the peak corresponds to the code phase. If no peak is located, the carrier frequency is changed. Full- and half-bin steps in carrier frequency are considered. Processing gain is achieved by using longer segments of the input signal, for example 4 or 16 ms and integrating 1-ms segments. Considerations are provided for compensating for the effects of a transition, should it occur in the short segment of the GPS signal being processed. Integrations can be performed using non-coherent and coherent techniques.

6 Claims, 8 Drawing Sheets

U.S. PATENT DOCUMENTS

| | | | |
|---|---|---|---|
| 4,975,707 A | 12/1990 | Smith | |
| 4,998,111 A * | 3/1991 | Ma et al. | 342/352 |
| 5,008,679 A | 4/1991 | Effland et al. | |
| 5,017,926 A | 5/1991 | Ames et al. | |
| RE33,629 E | 7/1991 | Palmer et al. | |
| 5,103,459 A | 4/1992 | Gilhousen et al. | |
| 5,126,748 A | 6/1992 | Ames et al. | |
| 5,202,901 A | 4/1993 | Chennakeshu et al. | |
| 5,271,034 A * | 12/1993 | Abaunza | 375/150 |
| 5,303,286 A | 4/1994 | Wiedeman | |
| 5,303,393 A | 4/1994 | Noreen et al. | |
| 5,309,474 A | 5/1994 | Gilhousen et al. | |
| 5,361,072 A | 11/1994 | Barrick et al. | |
| 5,365,516 A | 11/1994 | Jandrell | |
| 5,365,544 A | 11/1994 | Schilling | |
| 5,367,306 A | 11/1994 | Hollon et al. | |
| 5,379,047 A | 1/1995 | Yokev et al. | |
| 5,392,287 A | 2/1995 | Tiedemann, Jr. | |
| 5,396,647 A | 3/1995 | Thompson | |
| 5,412,388 A | 5/1995 | Attwood | |
| 5,412,389 A | 5/1995 | Olds | |
| 5,414,432 A | 5/1995 | Penny, Jr. et al. | |
| 5,414,728 A | 5/1995 | Zehavi | |
| 5,420,592 A | 5/1995 | Johnson | |
| 5,450,617 A * | 9/1995 | Moore | 455/71 |
| 5,459,473 A | 10/1995 | Dempster et al. | |
| 5,469,468 A | 11/1995 | Schilling | |
| 5,485,486 A | 1/1996 | Gilhousen et al. | |
| 5,546,087 A | 8/1996 | Martin Niera | |
| 5,557,637 A | 9/1996 | Glynn | |
| 5,565,764 A | 10/1996 | Priebe et al. | |
| 5,587,715 A | 12/1996 | Lewis | |
| 5,594,754 A | 1/1997 | Dohi | |
| 5,627,546 A | 5/1997 | Crow | |
| 5,629,707 A | 5/1997 | Heuvel et al. | |
| 5,691,980 A | 11/1997 | Welles, II et al. | |
| 5,752,976 A | 5/1998 | Duffin et al. | |
| 5,841,398 A | 11/1998 | Brock | |
| 5,872,810 A | 2/1999 | Philips et al. | |
| 5,874,914 A | 2/1999 | Krasner | |
| 5,912,558 A * | 6/1999 | Halamek et al. | 324/313 |
| 5,955,986 A | 9/1999 | Sullivan | |
| 5,963,157 A | 10/1999 | Smith | |
| 5,982,811 A | 11/1999 | Harrison et al. | |
| 6,031,489 A | 2/2000 | Wyrwas et al. | |
| 6,038,263 A | 3/2000 | Kotzin et al. | |
| 6,133,871 A * | 10/2000 | Krasner | 342/357.06 |
| 6,140,956 A | 10/2000 | Hillman et al. | |
| 6,148,022 A | 11/2000 | Raghaven et al. | |
| 6,177,907 B1 | 1/2001 | Golovin et al. | |
| 6,208,290 B1 | 3/2001 | Krasner | |
| 6,219,345 B1 | 4/2001 | Clark et al. | |
| 6,243,648 B1 | 6/2001 | Kilfeather et al. | |
| 6,249,245 B1 | 6/2001 | Watters et al. | |
| 6,295,449 B1 | 9/2001 | Westerlage et al. | |
| 6,313,786 B1 | 11/2001 | Sheynblat et al. | |
| 6,345,073 B1 | 2/2002 | Curry et al. | |
| 6,453,237 B1 * | 9/2002 | Fuchs et al. | 701/213 |
| 6,639,939 B1 | 10/2003 | Naden et al. | |

FOREIGN PATENT DOCUMENTS

| | | |
|---|---|---|
| JP | 2000-171541 | 6/2000 |
| WO | WO 97/14057 A1 | 4/1997 |
| WO | WO 00/10030 A1 | 2/2000 |
| WO | WO 00/14568 A1 | 3/2000 |

OTHER PUBLICATIONS

"The Staryrs Early Entry Program a Demonstration Program Using the Argos System", NACLS, Aug. 1992, 19 pages.

G. Vrckornik et al., "A Novel Approach for the SARSAT System," IEEE Transactions on Aerospace and Electronic Systems, vol. 27, No. 2, Mar. 1991, pp. 290-301.

W.H. Guier et al., "A Satellite Doppler Navigation System," Proceedings of the IRE, Nov. 23, 1959, pp. 507-516.

W.H. Guier, "Satellite Navigation Using Integral Doppler Data The AN/SRN 9 Equipment", Journal of Geophysical Research, vol. 71, No. 24, Dec. 15, 1996, pp. 5903-5910.

James L. Coates, "The Nimbus F. Random Access Measurement", IEEE Transactions on Geoscience Electronics, vol. GE-13, vol. 1, Jan. 1975, pp. 18-27.

T. Green, "SA Satellite Doppler Data Processing for Platform Navigation", IEEE Transactions on Geoscience Electronics, vol. GE-13, No. 1, Jan. 1975, pp. 28-38.

Richard B. Kershner, "The Doppler Concept and the Operational Navy Navigation System," Applied Physics Laboratory, Johns Hopkins University, pp. 5-9.

W. J. Geckle, et al., "Evaluation of the Ionospheric Refraction Correction Algorithm for Single-Frequency Doppler Navigation Using Tranet-II Data", Applied Physics Laboratory, Johns Hopkins University, 1982, pp. 13-21.

Randall W. Smith, "Dopplr-A Point Positioning Program Using Integrated Doppler Satellite Observations", pp. 839-856.

C. Boucher, "Methodology and Field Tests of GDOP, A Geodetic Computation Package for the Short ARC Adjustment of Satellite Doppler Observiations", Institute Geographique National France, pp. 417-422.

Brown, Duane C., "Doppler Positioning bythe Short Arc Method", DBA Systems, Inc., Melbourne, Florida, p. 97-129.

Coenen, A.J.R.M. et al., "Novel Fast GPS/GLONASS Code-Acquisition Technique using Low Update Rate FFT", Electronics Letters, Apr. 23, 1992, vol. 28, No. 9, pp. 863-865.

Van Nee, D.J.R. et al., "New Fast GPS Code Acquisition Technique Using FFT", Electronics Letters, Jan. 17, 1991, vol. 27, No. 2.

Supplementary Search Report.

* cited by examiner to cargo allows precise tracking of the locations of that cargo. These concepts can be extended to fleet management for common carriers and delivery management for delivery service providers. Numerous additional and new services are being deployed and developed for using the position-determining capabilities of GPS receivers.

SYSTEM AND METHOD FOR FAST CODE PHASE AND CARRIER FREQUENCY ACQUISITION IN GPS RECEIVER

This application claims the benefit of U.S. Provisional Application No. 60/223,973, filed Aug. 9, 2000.

BACKGROUND

1. Field of the Invention

The present invention relates generally to GPS positioning systems. More specifically, the present invention relates to improved code phase and carrier acquisition in GPS positioning systems.

2. Background of the Invention

The global positioning system (GPS) is employed to determine position in a multitude of applications. For example, in navigation applications, a user uses a GPS receiver to determine her instantaneous position as well as her position over time. Another use for GPS receivers tracking objects. For example, placing a GPS receiver in a truck allows tracking of the truck's movements. Attaching the receiver to cargo allows precise tracking of the locations of that cargo. These concepts can be extended to fleet management for common carriers and delivery management for delivery service providers. Numerous additional and new services are being deployed and developed for using the position-determining capabilities of GPS receivers.

FIG. 1 is a schematic diagram of a conventional GPS receiver 101 used for determining position. In FIG. 1, GPS receiver 101 is simplified to point out the primary relevant functions of a conventional GPS receiver. An antenna 102 receives a GPS signal from GPS satellites 103a, 103b, 103c and 103d. Antenna 102 applies the received GPS signal to a signal conditioning processor 104. Signal conditioning processor 104 amplifies, filters and downconverts the signal to baseband for processing. The baseband signal is applied to carrier and code phase tracking algorithms in processing block 106. Processing block 106 contains a multiplier 108, a correlator 110, a carrier frequency oscillator 112, a Gold code generator 114 and an integrator 116. Multiplier 108 multiplies the baseband signal by an estimated carrier frequency received from carrier frequency oscillator 112. Carrier frequency oscillator 112 can be a voltage controlled oscillator (VCO) or a numerically controlled oscillator (NCO). Correlator 110 correlates the signal with a replica of a Gold code generated by code generator 114. The Gold code is a unique and known code generated by each GPS satellite. The terms "code" and "Gold code" are used interchangeably herein. The output of correlator 110 is integrated in integrator 116. The output of integrator 116 is input to a digital signal processor 118 to generate information required for code tracking generator 114 and carrier frequency oscillator 112. This information includes carrier phase and code phase information.

The combination of carrier frequency oscillator 112, multiplier 108, integrator 116 and DSP 118 operates as a carrier tracking loop that compensates for errors in the down converter frequency reference as well as any Doppler shift associated with a particular satellite. The combination of code generator 114, correlator 110, integrator 116 and DSP 118 operates as a code tracking loop that compensates for any shift in the code phase of the received signal.

Generally, there are a series of processing blocks 106 running in parallel in a conventional GPS receiver. Each of the series of processing blocks is tuned to a different GPS satellite. Generally, there are at least 2 processing blocks 106 per GPS satellite.

GPS receiver 101 performs operates in two modes to process a GPS signal. First, the receiver must acquire the GPS signal's carrier frequency and Gold code phase. This is known as the acquisition mode. Second, receiver 101 must track the carrier frequency and Gold code phase using the carrier frequency and Gold code phase determined in the acquisition phase as a starting point. This is known as the tracking mode.

During the acquisition mode, a GPS receiver uses a priori knowledge. For example, the receiver knows the nominal carrier frequency of the GPS signal. However, the nominal carrier frequency is not likely to be the one actually received by the receiver for several reasons. First, Doppler shift caused by the relative motion of the transmitting satellite and the receiver changes the received carrier frequency. Moreover, the local oscillator (not shown) introduces its own errors. Consequently, both the carrier frequency and offset of the Gold code (Gold code phase) must be determined.

To make these determinations, conventional GPS receivers generally perform a serial search by trying different combinations of carrier frequency and code phase until the output of integrator 116 exceeds a pre-determined threshold, indicating that a match has been obtained. The search must be performed for each GPS satellite the receiver will use to determine position. Using multiple processing channels as described above, the GPS receiver can perform the searches in parallel.

FIG. 2 is a graphical representation of a search process performed by conventional GPS receiver 101 to determine carrier frequency and Gold code phase. Oscillator 112 is typically set to the nominal carrier frequency of the GPS signal. In addition, the code is generated by code generator 114 with an initial code phase. If the received carrier frequency and code phase match the carrier frequency generated by oscillator 112 and the code phase of the code generated by code generator 114 respectively, the output of integrator 116 is relatively high. On the other hand, if the carrier frequency or the code phase do not match, the output of integrator 116 is relatively low, and may be essentially noise.

Generally, a conventional search algorithm first sets a frequency and lets the Gold code phase vary. As the code phase varies, controller 118 measures the output of integrator 116. If the output of integrator 116 exceeds a pre-determined threshold, controller 118 presumes that lock has been achieved and controller 118 places the receiver in its tracking mode using the values determined by the search algorithm for carrier frequency and code phase. If the output of integrator 116 does not exceed the predetermined threshold, controller 118 presumes that lock has not been achieved. Once all code phases (code phase cp1 through cpN) have been tried, controller 118 switches carrier frequency oscillator to output a carrier frequency f2. The process is repeated for each code phase cp1 through cpN, and each frequency frequency 1 through frequency M, unless controller 118 stops the process early because the output of integrator 116 indicates a lock condition. If no frequency code phase combination is found, the receiver cannot acquire the signal.

Conventional GPS receivers perform each step in the above process on a different part of the received signal. That is, at each step, a new portion of the GPS signal received by the receiver is processed. While conventional GPS receivers can sometimes acquire the GPS signal in a few seconds, in general acquisition is significantly longer.

After the acquisition mode, the receiver switches to a tracking mode. In the tracking mode, the receiver continually adjusts the frequency of oscillator 112 and the offset of the Gold code phase to maintain lock to the incoming carrier and code phase. Code phase tracking is typically assisted in a well-known manner using early and late code generators that generate early and late codes respectively (as well as a punctual code). If the received code correlates better with the early code, controller 118 reduces the phase delay of code generator 114. If the received code correlates better with the late code, code generator increases the phase of code generator 114. No change is made if the received code correlates best with the punctual code.

Carrier tracking is typically accomplished by analyzing the phase of the signal output by the integrator. If the carrier frequency generated by oscillator 112 matches the received carrier frequency, then there will be no phase rotation. If there is no such match, then controller 118 increases the frequency or decreases the frequency of oscillator 118 to compensate for any phase rotation.

In addition to tracking, the receiver can demodulate the 50 Hz data modulated on the carrier of the GPS signal. This 50 Hz signal carries information related to the particular satellite that transmitted the signal. For example, this signal contains ephemeris information that provides information on the position and motion of the GPS satellite.

SUMMARY OF THE INVENTION

The present invention is related to improving the acquisition phase of a GPS receiver by reducing the time required to acquire the GPS signal, using only a very short portion of the received GPS signal. That is, the present invention reduces the time required for the receiver to determine the proper carrier frequency and Gold code phase. This information can replace the acquisition phase conventional GPS receiver by providing the initial value of carrier frequency and Gold code phase for the receiver to use in its tracking phase. In addition, the code phase measurements derived using the present invention can be used themselves to determine position in a system such as the system described in U.S. Pat. No. 6,243,648 to Kilfeather et al., which is hereby incorporated by reference herein in its entirety.

In one embodiment of the present invention, a GPS signal is received and conditioned by a signal-conditioning processor. The GPS signal so received is a composite signal having contributions from all of the GPS signals in view of the receiver. A short portion of the signal is collected and stored in a memory. An FFT is performed on the short portion of the signal to convert it to the frequency domain. A Gold code sequence is generated. An FFT is performed in the generated Gold code sequence to convert it to the frequency domain. Because the Gold code is a known sequence, generating the Gold code sequence and converting it to the frequency domain are preferably pre-operability events. That is, the Gold code sequence and its frequency domain representation can be pre-computed prior to using the GPS receiver to determine position. In that manner, the Gold sequence and/or its frequency representation are stored in the memory for future operation. The FFT of the short portion of the input signal and the Gold sequence are multiplied. An inverse FFT operation is performed to convert the product to the time domain. The time domain representation is the convolution of the short portion of the input signal with the generated Gold code sequence. A magnitude calculator calculates a point-by-point magnitude of the time domain product. A peak detector determines where the peak is located. The peak represents the code phase in the short portion of the signal.

If no peak is present, the controller moves to a new carrier frequency and repeats the process. This can be performed by multiplying a time domain signal by a complex exponential having a frequency equal to the frequency shift. Alternatively, this can be performed by shifting all bins in the frequency representation of the input GPS signal or Gold code one way or the other by a predetermined number of bins. The frequency shift will be equivalent to the resolution of the FFT times the number of bins shifted. The Gold code detection process is then continued. This continues until a peak is observed, or if no peak is observed after all desired frequencies have been tested, the process ends without successful acquisition. The entire process is repeated for each GPS satellite contributing to the input signal by using the Gold code unique to each such GPS satellite.

In a another embodiment of the present invention, the process described above is performed on a longer duration of the input GPS signal so that integration can be used to make the code phase peak more distinct. In this embodiment, a multiple millisecond portion of the input GPS signal is collected and stored in memory. The input GPS signal is divided into one millisecond segments. Each millisecond segment is converted to the frequency domain as a frequency domain representation of that segment. The frequency domain representations are multiplied by a frequency representation of the Gold code unique to one of the satellites in view of the receiver. Preferably, the frequency representation of the Gold code was generated and stored prior to operation of the receiver. The product of each multiplication is converted to the time domain and represents the convolution of the each of the 1 ms segments with the Gold code for the particular satellite. The magnitude of each point in the convolutions is calculated. The magnitudes are integrated (summed) point-by-point across the convolutions. A peak is then detected. The location of the peak corresponds to the code phase. The carrier frequency is determined as above by appropriate shifting of the input signal or the Gold code in the frequency domain.

In another embodiment of the present invention, the integration discussed above is performed using coherent processing. Two steps are performed. The first step is to determine a coarse code phase (the peak location in the convolutions) and a coarse carrier frequency using the multiple millisecond method described above. Then, a complex sine wave is fitted to the points at the location of the peaks in the convolutions. The frequency of this sine wave is the difference between the received carrier and the estimated coarse carrier frequency. The points in the convolutions are phase rotated to remove this frequency difference by complex multiplication of each convolution with a complex exponential at a frequency equal to the fitted sine wave. Doing so makes the convolutions coherent to one another. The convolutions are then integrated (summed) point-by-point. The magnitude of the sum is taken at all of the points and the location of the peak is detected. The process is optimized by rotating, summing and taking the magnitude of only a few points around the probably location of the peak, as well as the peak itself. Interpolation techniques are then applied to further refine the location of the peak.

The present invention is described in greater detail in the detailed description of the invention, the appended drawings and the attached claims.

DETAILED DESCRIPTION OF THE INVENTION

The present invention is related to improving the acquisition phase of a GPS receiver by reducing the time required to acquire the GPS signal, using only a very short portion of the received GPS signal. Preferably, the short portion is between a millisecond and a second of the input GPS signal. Thus, the present invention reduces the time required for the receiver to determine the proper carrier frequency and Gold code phase. The invention allows for signal acquisition using collected portions of the signal as short as 1 millisecond in duration.

Figure 1:
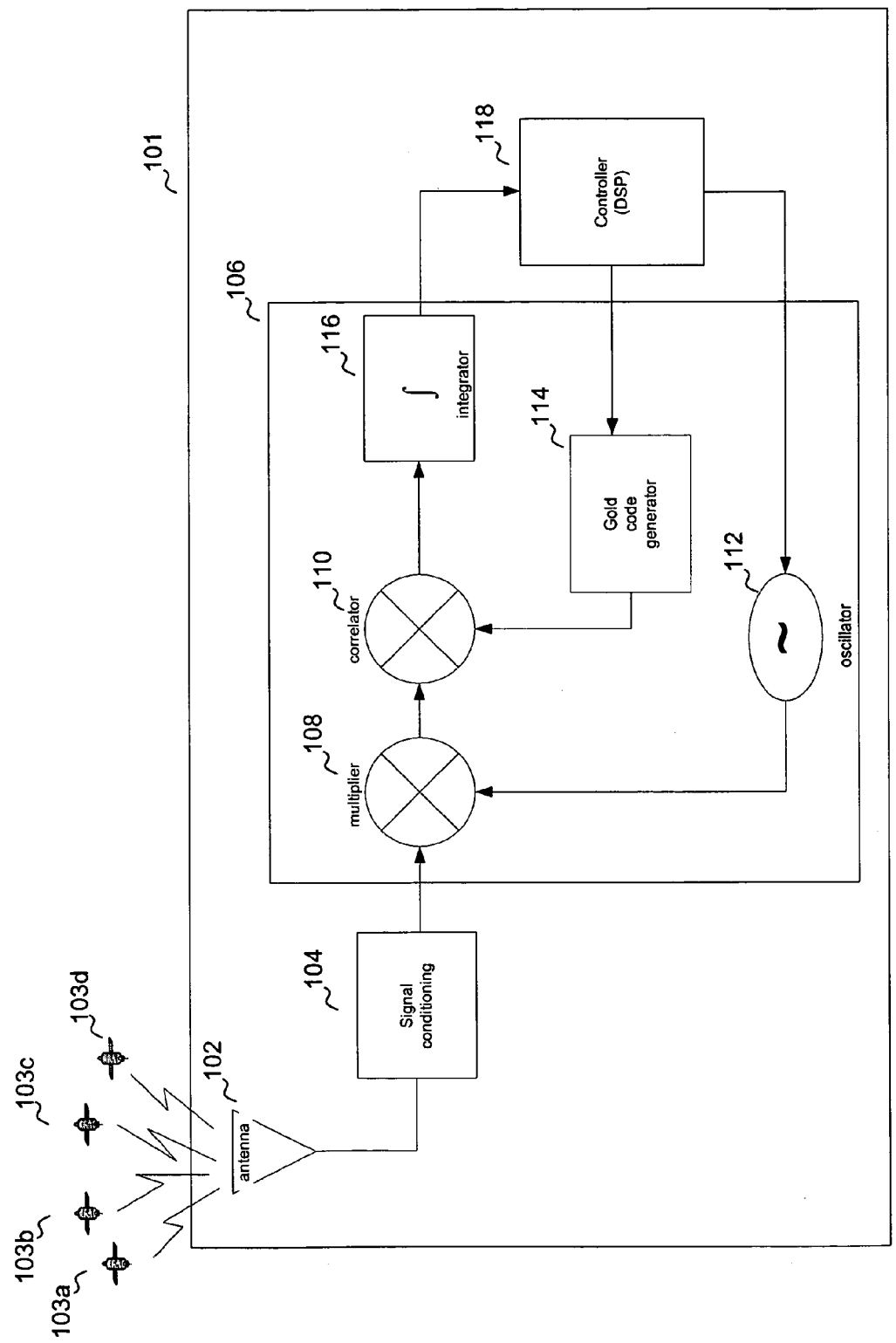
FIG. 1 is a schematic diagram of a conventional GPS receiver used for determining position.
Figure 2:
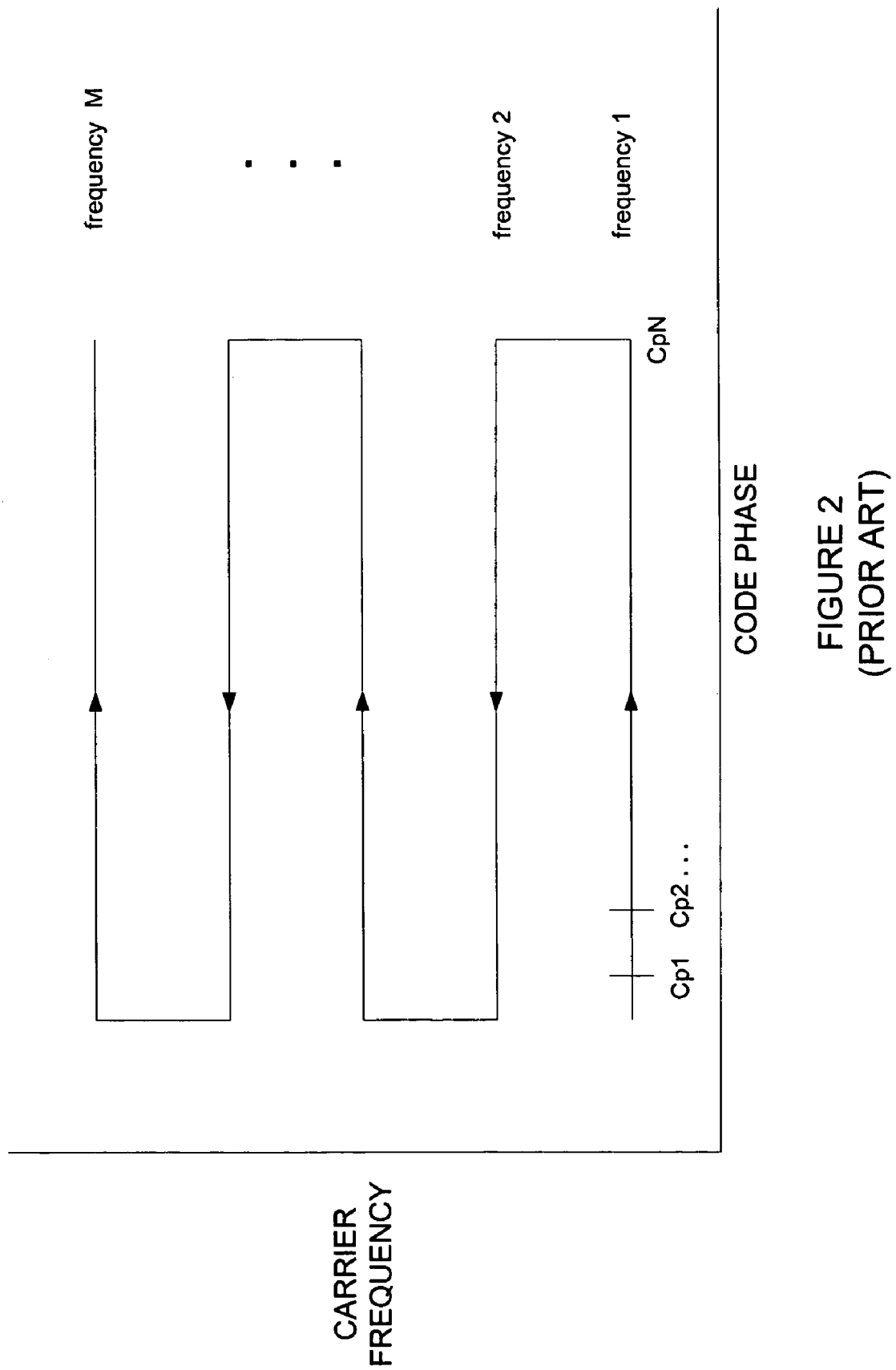
FIG. 2 is a graphical representation of a search process performed by conventional GPS receiver to determine carrier frequency and Gold code phase.
Figure 3:
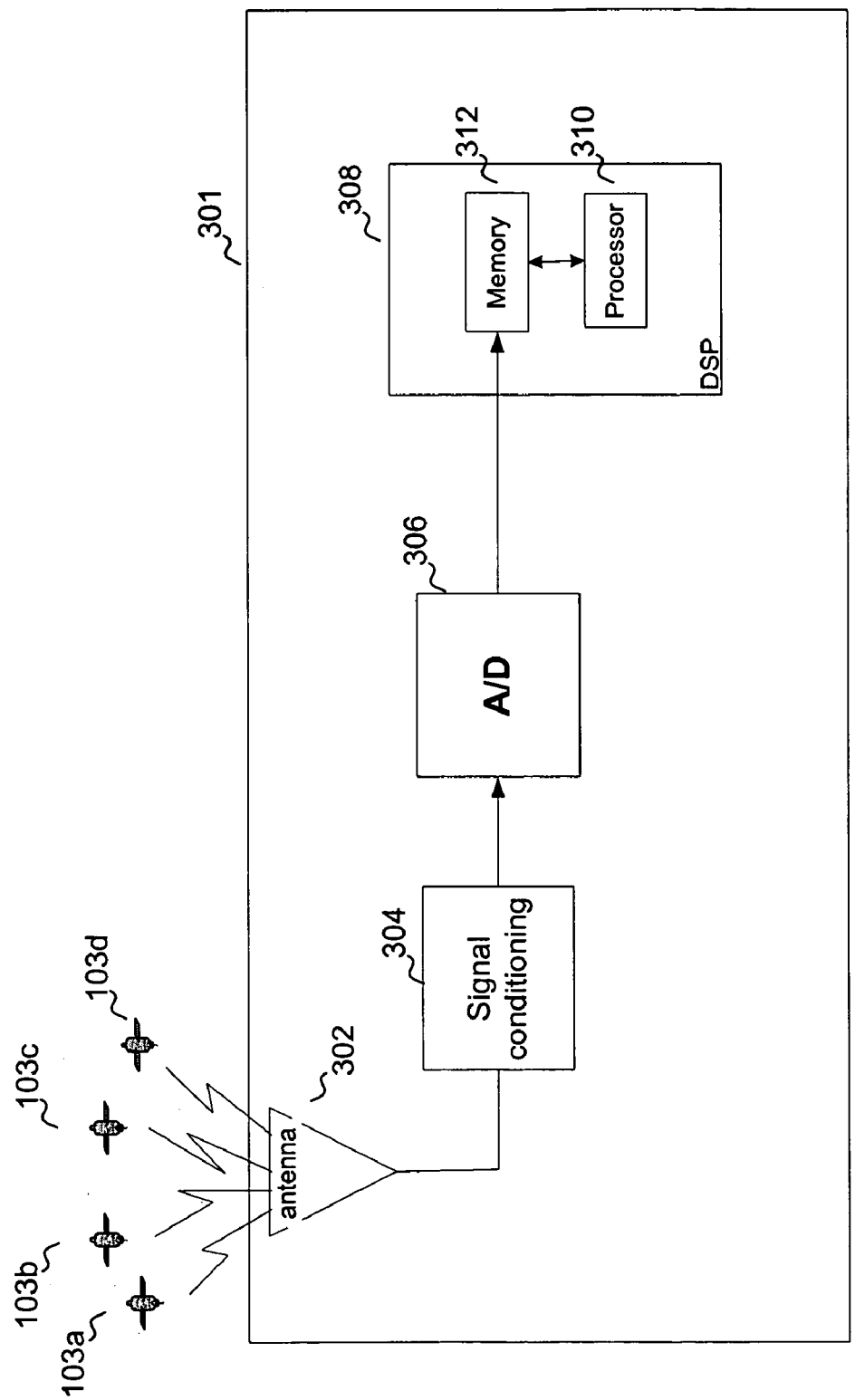
FIG. 3 is a schematic diagram of a GPS receiver for acquiring a GPS signal received from one or a plurality of GPS satellites that can be used according to the present invention.

FIG. 3 is a schematic diagram of a GPS receiver 301 for acquiring a GPS signal received from a one or a plurality of GPS satellites that can be used according to the present invention. For the sake of clarity only a single channel will be described in the following. However, it would be apparent to those skilled in the art that the single channel described can be replicated with suitable changes in Gold code generation to process the input signal for all GPS satellites in view simultaneously. Each channel uses a Gold code generator to generate a Gold code corresponding to the particular GPS satellite whose signal the channel is intended to receive. Alternatively, a single channel is used in a serial mode by processing the signal using the Gold code for each GPS satellite in turn.

Receiver 301 includes an antenna 302 that receives a composite GPS signal That is, the input GPS signal received by receiver 301 has contributions from all of the GPS satellites in view of the receiver 301. Antenna 302 is coupled to a signal conditioning processor 304. Signal conditioning processor 304 amplifies and filters the GPS signal collected by antenna 302. Preferably, signal conditioning processor 304 also converts the signal to some other frequency, such as baseband, for processing. The baseband signal is digitized by an analog-to-digital A/D converter 306. The digitized signal is then stored in a memory 312. Memory 312 is accessible to, or part of, a digital signal processor (DSP) 308. A processor 310 using memory 312 processes the GPS signal as described below to acquire the signal, i.e., to determine the carrier frequency and code phase for each of the GPS satellites contributing to the GPS signal.

A/D converter 306 is any A/D converter that can digitize the signal at twice the information bandwidth. In this case, the information bandwidth is the GPS chip rate of 1.023 MHz (assuming signal-conditioning processor 304 down-converts the signal to baseband). For a complex signal, therefore, the minimum sampling rate is 1.023 MHz. In general, a higher sample rate is better, but the sample rate is constrained by the size of memory 312. Preferably, the sample rate is 2.048 MHz.

Any portion of the GPS signal can be stored in memory 312. Preferably, however, the portion of the GPS signal stored is more than millisecond and less than a second. More signal allows longer integration times, which is useful where the signal-to-noise ratio (SNR) is low, but comes at the expense of a longer processing time. This is a design trade-off that is determined by each implementation of the present invention.

As mentioned above, the digitized GPS signal contains contributions from each of the GPS satellites in view of the receiver. The receiver determines which of the satellites is in view using publicly available information in a number of well-known ways. For example, the receiver can correlate the received signal with all published GPS Gold codes. Alternatively, if the receiver has a current almanac, the current time and approximate location (e.g., from its last position determination), the receiver can compute the GPS satellites in view. Further, the GPS receiver can be told which satellites are in view from a communication link. In this manner, the receiver knows which Gold code sequences to apply in its processing.

The Gold code phase and carrier frequency are determined from the stored input GPS signal as follows. The terms "delay of the Gold code," "Gold code phase" and "code phase" are used interchangeably herein. As mentioned above each GPS satellite is assigned a unique Gold code that is transmitted in the GPS signal. Thus, the composite signal collected by antenna 302 contains the GPS signal, and the corresponding Gold code for each satellite in view of the GPS receiver. The Gold codes are publicly available.

There are 1,023 bits or chips in the Gold code, which are transmitted at a rate of 1.023 Mhz. Thus, a complete Gold code sequence has a 1-ms duration (i.e., repeats every millisecond). Every 20 Gold code sequences (20 milliseconds) there may be a phase shift (or transition) of the GPS signal by 180 degrees. If a phase shift occurs, the signal inverts. Consequently, obtaining at least a 1-ms portion of the GPS signal guarantees that at least one full sequence of the Gold code is captured. The problem then is to find where the sequence begins in the 1 millisecond segment of the input GPS signal that has been collected.

Figure 4:
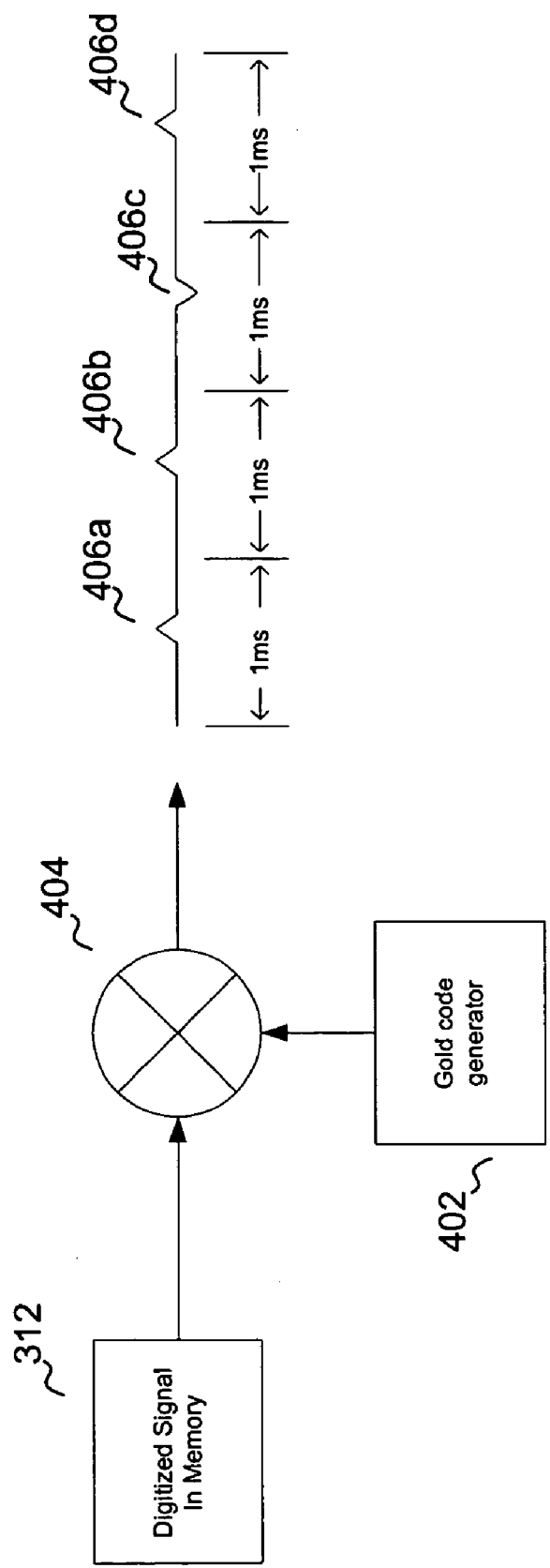
FIG. 4 is a schematic diagram of a processor for determining the location of the Gold code sequence.

FIG. 4 is a more detailed schematic diagram of processor 310 for determining the location of the Gold code sequence. The digitized signal stored in memory 312 is convolved with the known Gold code to determine where the Gold code begins. The known Gold code is generated by a Gold code generator 402. The Gold code generated by Gold code generator 402 is convolved with the received GPS signal in convolver 404. Convolver 404 outputs a convolved signal 406. Each peak 406a, 406b, 406c or 406d represents where the Gold code generated by Gold code generator 402 matched best with the Gold code in the digitized GPS signal.

Note that peak 406*c* is inverted. This is an example of the effect of the 180 degree phase shift (also referred to as "transition" herein) inherent in the GPS signal that occurs potentially every 20 milliseconds.

As is well-known, convolution in the time domain is a computationally intensive process. Consequently, the present invention preferably uses frequency domain techniques for performing the convolution of the received GPS signal with the known replica of the Gold code.

Figure 5A:
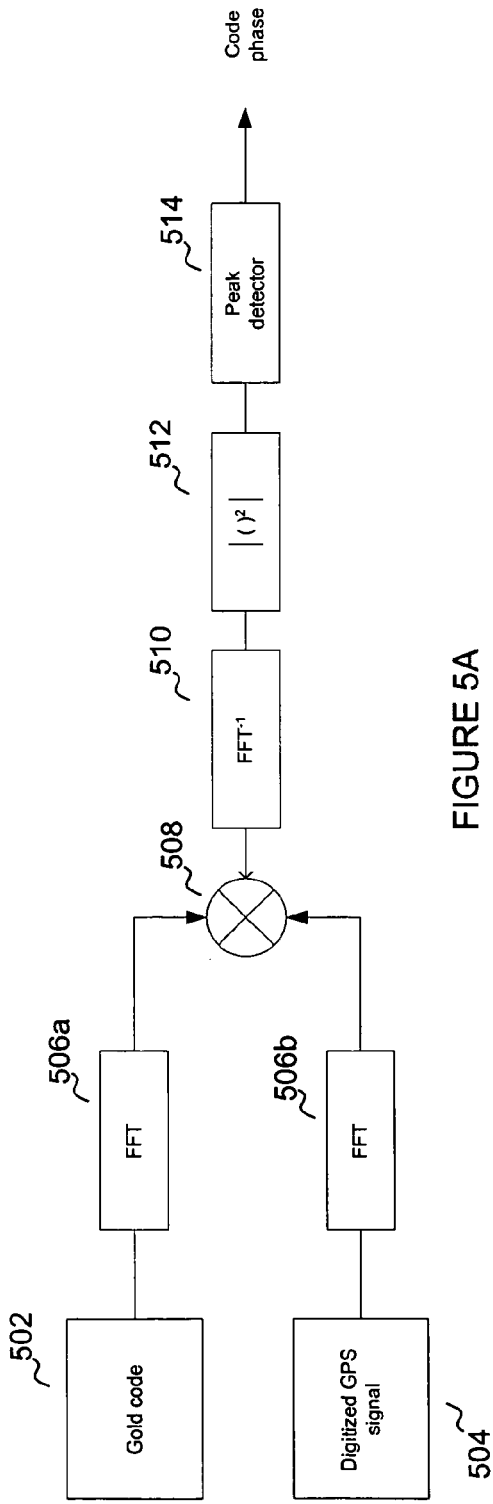
FIG. 5A is a schematic diagram of frequency domain processing according to a first embodiment of the present invention.

FIG. 5A is a schematic diagram of frequency domain processing according to a first embodiment of the present invention. For clarity, the processing is described for a 1-ms portion of the input GPS signal. Gold code sequence generator 402 generates a 1-ms (i.e., complete cycle) portion of the Gold code. The Gold code is input into an FFT algorithm 506*a*. The digitized 1-ms portion of the received GPS signal 504 is input to an FFT algorithm 506*b*. The output of the FFT algorithms is the frequency domain representation of the signal. The frequency domain representations of the input GPS signal segment and the Gold code are multiplied by a frequency domain multiplier 508.

As is well-known, multiplication in the frequency domain is equivalent to convolution in the time domain, but requires far fewer operations. The frequency domain multiplication product is converted back to the time domain by an inverse FFT algorithm 510. A magnitude calculator 512 performs a point-by-point magnitude calculation on the output of inverse FFT algorithm 510. A peak detector 514 determines the location of the peak by determining where a bin value exceeds a pre-determined threshold. That bin location is taken as the code phase of the received GPS signal. Interpolation techniques can be used to refine the peak location and are described below.

Any size FFT can be used. However, in one embodiment of the present invention, the FFT resolution varies depending on which signal is being processed and what stage the process is in. Moreover, FFTs are not required and powers of 2 are not required. However, powers of 2 are preferred as they permit use of computationally efficient algorithms such as the FFT. In one embodiment of the present invention, the FFT resolution is 1 KHz/bin. The input signal is digitized at 4.096 MHz. To obtain the 1 KHz resolution a 4,096 point FFT is used to convert the incoming signal to the frequency domain. Because the information bandwidth is 1.023 MHz, the signal is oversampled. Consequently, only the lowest 1,024 points are used, yielding a 1.024 MHz effective bandwidth FFT with a 1 KHz resolution.

Figure 5B:
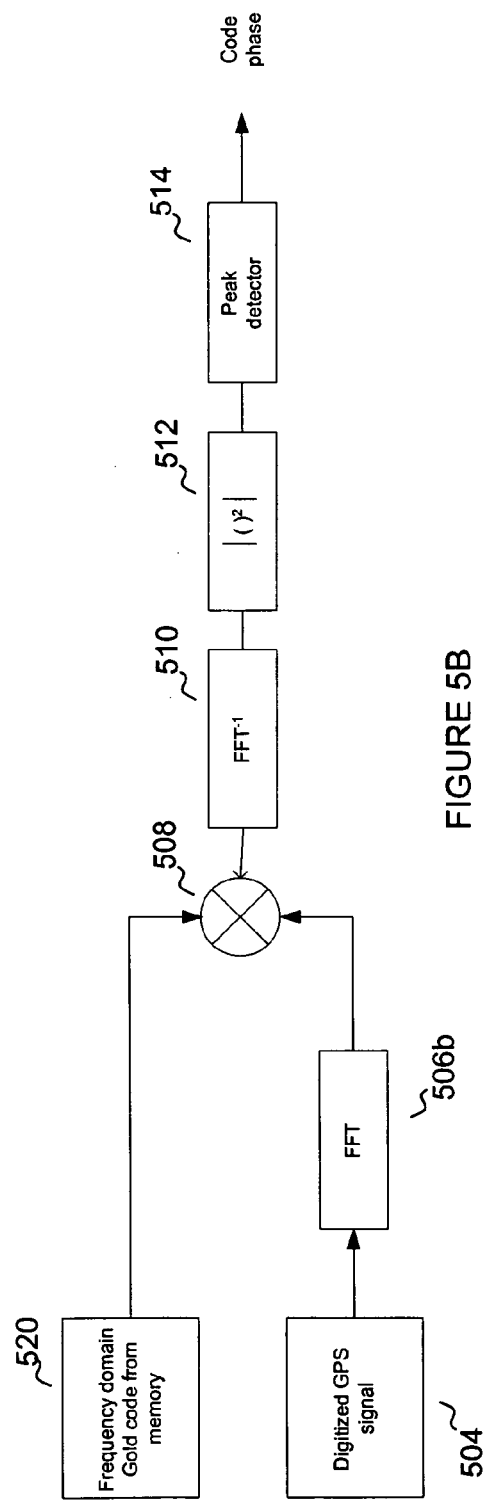
FIG. 5B is a schematic diagram of frequency domain processing according to a second embodiment of the present invention.

As described above, the Gold code sequence is unique for each GPS satellite. It is a permanent and unchanging code. Consequently, the FFT of the Gold code sequence can be pre-computed and stored in a non-volatile memory, such as ROM, PROM, EPROM, EEPROM or any other non-volatile memory. In addition, the FFT can be stored in memory 312 upon initialization. FIG. 5B is a schematic diagram of a system according to a second embodiment of the present invention that can be used when the frequency domain representation of the Gold code is pre-computed and stored prior to operation of the system. The pre-computed frequency domain representation of the Gold code 520 is input to frequency domain multiplier 508 and processing continues as described above.

Another improvement offered by the present invention arises from recognizing that the contribution of each GPS satellite in view of the GPS receiver is present in the composite input GPS signal. Consequently, the same signal portion can be used for all GPS satellites. Consequently, the input signal segment needs to be converted to the frequency domain only one time.

As mentioned above, if the carrier frequency used to mix the signal to baseband is not the true carrier frequency, the output of multiplier 404 or 508 is essentially noise. Consequently, there will be no discernible peak in the magnitude generated by magnitude calculator 512. That is, there probably will be no bin that has a value greater than the pre-determined threshold for the peak. When this occurs, processor 310 assumes that the carrier frequency used to generate the Gold code is incorrect. Thus, it changes the carrier frequency by a pre-determined amount and repeats the above process. It continues repeating the above process until a set of discrete carrier frequencies is tested that covers the expected Doppler uncertainty and the frequency uncertainty of oscillator used to mix the signal to baseband. Once an carrier frequency is found that causes a peak (a bin having a value greater than the pre-determined threshold), processor 310 discontinues searching for a carrier frequency and uses the carrier frequency that provides a peak.

Shifting the frequency using the present invention is relatively simple since the digitized signal has already been converted to the frequency domain. This is because the frequency of the signal is changed simply by shifting the FFT of the signal by N bins. The total frequency shift is N times the resolution of each bin. Shifting to the left decreases frequency, while right shifting increases frequency. If a frequency shift of other than the bin resolution is desired, it is accomplished by multiplying the time domain representation of the signal by a complex exponential having a frequency equal to the desired offset prior to performing the FFT.

In addition, to minimize losses due to not matching the actual carrier frequency, the carrier frequency is also stepped in half-bin resolutions. The way this is accomplished is to multiply the digitized signal stored in memory 312 by a complex exponential having a frequency equal to half a bin resolution. The FFT of this half-bin shifted frequency is then taken and the above procedure is repeated for this signal. The highest resulting peaks are compared, and the carrier frequency and code phase corresponding to the higher of the two peaks is chosen as the code phase and carrier frequency. It should be noted that better results are obtained for smaller frequency shifts, i.e., higher resolution. However, such higher resolution processing requires more processing time to perform.

The Gold code is sampled at 1.024 MHz. Although the Gold code could be sampled at its inherent 1.023 MHz, it is preferable to sample at a rate that is a power of 2, so that efficient algorithms such as the FFT can be used. A 1024-point FFT is applied to the sampled Gold code sequence.

As mentioned above, the Gold code sequence is unique to each satellite. It is permanent (i.e., does not change for a given satellite) and well-known. Therefore, the Gold code and consequent frequency representation for each satellite can be pre-computed and stored in a table for later access. Thus, the Gold code sequences for each satellite are applied to FFT algorithms to generate frequency representations of the respective Gold codes. These frequency representations of the Gold codes are stored in a memory before the receiver is placed in operation. The frequency representations can be stored in any type of non-volatile memory, for example ROM, EPROM, EEPROM and any other memory device accessible by processor 310. Moreover, the frequency representations are preferably stored in a table. When processor 310 requires the frequency representation of a particular satellite's Gold code, it retrieves it from the table, rather than computing it at runtime.

The pre-computed Gold code sequence also provides more efficient performance of the half-bin analysis described above. In this case, the frequency representation of the Gold code is shifted by a half bin and stored in memory as described above for the non-shifted Gold code. This shifted Gold code is used for the half bin analysis. The improved computational efficiency must be weighed against the additional memory resources required to store the pre-computed half-bin shifted Gold code. As with shifting the input signal in frequency, better results are obtained for smaller frequency shifts, i.e., higher resolution. Again, however, such higher resolution processing requires more processing time to perform.

The frequency domain representations of the input signal and the Gold code for a particular satellite are multiplied against one another to generate a product signal. The product signal is the frequency domain representation of the convolution of the input signal and Gold code. Inverse FFT algorithm 510 performs the inverse FFT operation to obtain the time domain convolution of the two signals.

Inverse FFT algorithm 510 could perform a 1024 point inverse FFT. However, the results can be substantially improved by increasing the resolution of the inverse FFT operation. This is done by appending 0's to the end of the product signal. For example, doubling the resolution is achieved by appending 1024 0's to the end of the product signal and taking a 2048-point inverse FFT. Likewise, quadrupling the resolution is achieved by adding 3072 0's to the end of the product signal and taking a 4096-point FFT. Increasing resolution of FFTs and inverse FFTs in this manner is well-known to those skilled in the art.

Increasing the resolution of the inverse FFT operation reduces the risk of the real peak of the convolution of the input signal and Gold code falling between bins of the inverse FFT operation. Spreading the peak energy between bins can make the peak harder to detect, especially in the high noise environment in which GPS receivers operate. Moreover, the peak energy in either bin may not be greater than the pre-determined threshold. As a result, peak detector 514 will not detect a peak that is validly there. Increasing the resolution of inverse FFT operation 510 avoids this problem.

Another consequence of taking a 4,096 point FFT of the input signal is that when performing the frequency shift described above, the shifting should be performed using all 4,096 points in the original FFT. Although the shift could be done using just the 1,024 lowest points, more accurate results are obtained by shifting using the 4,096 point FFT, and using the lowest 1024 points that result.

Because the GPS signal is extremely weak, the peak is unlikely to be detectable if processing integrates over only 1 millisecond. Consequently, results are improved if several milliseconds of input GPS signal are digitized, stored and processed. For example, using 4 or 16 milliseconds of data improves results due to gains that are achieved by integrating over these time periods to overcome the effects of noise. However many milliseconds are used, preferably the number is an integer multiple of 1 millisecond so that a complete Gold code sequence is observed in each millisecond of the signal collected. The Gold code (whose repetition interval is 1 millisecond) should occur in the same place in each millisecond sample of the signal collected.

Figure 6:
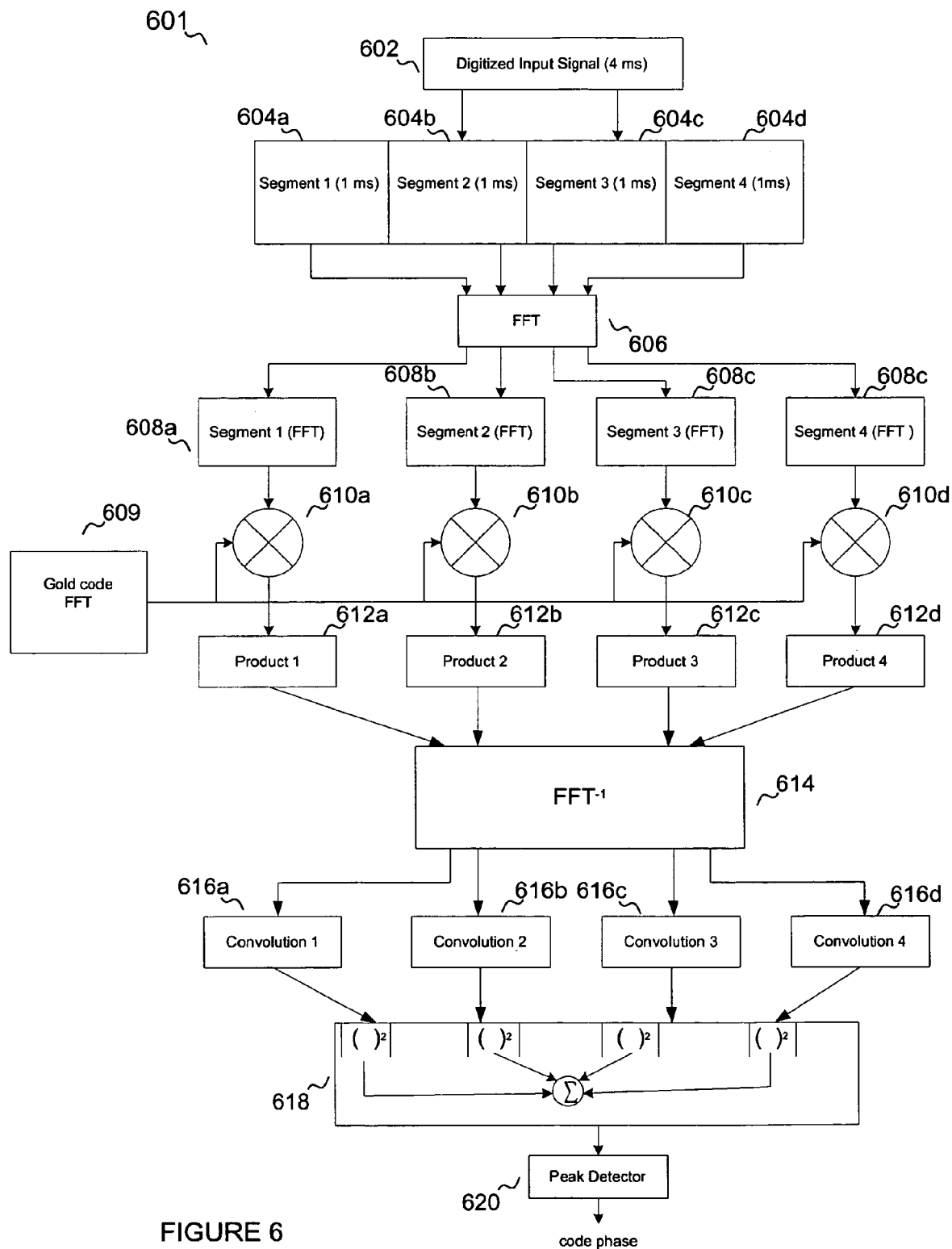
FIG. 6 is a schematic diagram of an embodiment of a system for processing a multiple millisecond portion of the input GPS signal according to a third embodiment of the present invention.

FIG. 6 is a schematic diagram of an embodiment of a system 601 for processing a multiple millisecond portion of the input GPS signal according to a third embodiment of the present invention. In FIG. 6, a 4 ms portion of the input signal 602 is collected for processing.

As described above, the signal so collected can be any length, but is preferably an integer multiple of 1 millisecond. Input signal 602 is divided into 4 segments 604a, 604b, 604c and 604d.

An FFT processor 606 performs an FFT on each of the 4 segments. As described above, only the first 1,024 points are kept for further processing. The 1,024-point segments are segments 608a, 608b, 608c and 608d corresponding to input signal segments 604a, 604b, 604c and 604d, respectively. As would be known to those skilled in the art, this is a circular convolution, modulo 1 ms. Though circular convolution is sufficient in most cases, some processing gain is obtained by using a linear convolution where a transition occurs in the collected signal. This is described in more detail below.

FFT segments 608a, 608b, 608c and 608d are multiplied by a frequency domain representation of the Gold code 609 associated with a GPS satellite contributing to digitized input signal 602. As described above, frequency domain Gold code 609 is preferably pre-computed. Alternatively, an FFT of the time domain Gold code is performed to obtain frequency domain Gold code 609. The multiplication proceeds point-by-point in multipliers 610a, 610b, 610c, and 610d for each FFT segment and the product for each segment is stored in product 612a, 612b, 612c and 612d, respectively. As described above, this operation is equivalent to time domain convolution.

An inverse FFT algorithm 614 performs an inverse FFT on each product 612a, 612b, 612c and 612d to yield convolutions 616a, 616b, 616c and 616d, respectively. Convolutions 616a, 616b, 616c and 616d correspond to convolutions of the Gold code with input signal segments 604a, 604b, 604c and 604d, respectively.

If the carrier frequency is substantially correct, there should be a peak in each of these convolutions corresponding to where the Gold code is in each segment. It should be in the same place in each segment. Consequently, integration of the convolutions on a point-by-point basis should improve the ability to distinguish the peak from noise. A magnitude-and-sum algorithm 618 is used to perform the integration.

Convolutions 616a, 616b, 616c and 616d are applied to a magnitude and sum algorithm 618. Magnitude and sum algorithm 618 performs a point-by-point magnitude and summing operation for each of the 1,024 points convolutions 616a, 616b, 616c and 616d. The sum of the points corresponding to the peak location should be greater than for other points which should be essentially noise values. A peak detector 620 determines the location of the peak by comparing each of the 1,024 points in the sum to a pre-determined peak threshold. If a value is greater than the peak threshold, the location where that value occurs is assumed to be the location of the peak. The peak location is the estimate of the code phase associated with the GPS satellite currently being processed.

The correct carrier frequency is also determined as described above. If no peak is apparent, the frequency is shifted by the resolution of an FFT bin as described above. The half-bin analysis described above can be performed when processing multi-millisecond portions of the signal as well. In this instance, the half-bin processing is performed for each of the four 1-millisecond segments. That is, a complex exponential having a frequency equal to half a bin is multiplied by each of the 4-ms input signal segments 604a, 604b, 604c and 604d to shift the frequency by half a bin. Processing is repeated as described above, using the frequency-shift 4-ms input signal. In addition, if desired, zeros can be appended to products 612a, 612b, 612c and 612d prior to applying inverse FFT algorithm to provide better bin resolution for peak detection. Alternatively, as described above, frequency shifting can be accomplished by shifting frequencies in the frequency domain and shifting the Gold code FFT rather than the input GPS signal FFT.

This processing is repeated for each GPS satellite contributing the composite input GPS signal. For each satellite, that satellites unique Gold code for each satellite.

The foregoing processing assumed that there was no transition in the Gold code sequence of the collected portion of the GPS input signal. As described above, every 20 milliseconds the Gold code potentially inverts. The location of the transition in the 1 millisecond segment significantly effects the convolution of the Gold code for that particular segment. If the transition occurs at the beginning of the segment, there is a substantially negative peak. This does not affect the result since magnitudes are used in the summation. As the transition moves further from the beginning of the segment, the peak degrades. It becomes negligible when the transition occurs in the middle of the segment. As the transition moves away from the middle of the segment, the peak that should result from the convolution increases in value. It returns to its maximum positive value where the transition occurs at the end of the segment. The worst case, therefore, is that the transition completely eliminates any contribution to the peak from the 1-ms segment in which it occurs. Consequently, if the transition occurs in the middle of a segment, then only 3 segments contribute to the peak where a 4 ms of input signal are integrated. Similarly, only 15 segments contribute to peak where a 16 ms of input signal are integrated. Thus, the transition is not likely to significantly degrade processing.

The foregoing problem with the transition can be avoided by performing a linear convolution instead of the piecewise circular convolutions described above. An efficient class of techniques for performing such linear convolution is known generally as sectioned convolution. In sectioned convolution, overlapping segments of the entire portion of the input signal stored in memory are convolved with the Gold code FFT stored in memory. The FFT of each overlapping section is taken and multiplied by the Gold code FFT. The inverse FFT of the result is calculated, and the overlap-save or overlap-add technique is performed using the result. Two well-known sectioned convolution techniques, the overlap-save and overlap-add techniques, are described in LAWERENCE R. RABINER & BERNARD GOLD, THEORY AND APPLICATION OF DIGITAL SIGNAL PROCESSING, § 2.25 ("Sectioned Convolutions") (1975), which is hereby incorporated by reference herein in its entirety.

For the example, using a 4 ms portion of the input signal, the result of the sectioned convolution is a 4 ms linear convolution of the Gold code with the input signal. This signal is split into four 1-ms segments. The magnitude of each segment is calculated and the magnitudes for all of the segments are summed in a point-by-point fashion as described above. Because the sectioned convolution uses the entire Gold code sequence for each segment across segment boundaries, the difficulty described above with the transition where circular convolution is used is not present. Rather, the peak will be inverted where there is a transition. As described above, because magnitudes are used in the summing process, the presence of an inversion is immaterial.

The process described so far uses non-coherent averaging. Averaging and integration are used synonymously herein. The location of the peak can be further refined using coherent averaging. A two-step process is employed for coherent averaging. In the first step, the above-described multi-segment technique is employed to obtain a coarse estimate of the carrier frequency and code phase. In the second step, coherent signal processing techniques are used to refine the obtained carrier frequency and code phase estimates.

The coherent processing technique uses convolutions 616a, 616b, 616c and 616d. It is desirable to average these together by summation and then take the magnitude and perform peak detection. However, in order to perform such an operation, the frequency must be known very precisely. This is because, as you move across time in the input signal, any frequency difference between the input signal and the estimated carrier frequency manifests itself as a vector rotation, i.e., phase offset, in the data. This phase offset degrades the magnitude of the sums that are calculated. Over a millisecond, this vector rotation is probably not significant. However, over several milliseconds, this vector rotation can be detrimental to the averaging process.

To account for the vector rotation, the frequency of the rotation is determined. This is done by analyzing the complex values at the locations of the peaks (determined above) in each of the 1 ms convolutions 616a, 616b, 616c and 616d. The frequency is determined using any of a number of well-known techniques. For example, a four point FFT can be performed to determine the frequency of the sine wave. Accuracy is improved by the zero-appending technique described above. For example, better accuracy is obtained by appending 4, 12, 28 or any number of zeros. Preferably, the size of the FFT is a power of 2 for computational efficiency. The FFT averages out the noise that is present in each individual value at the peak. Other curve-fitting techniques for determining the frequency of the sine wave using the complex values at the locations of the peaks would be apparent to those skilled in the art.

Using this frequency offset, the rotation of the vector is compensated for in each of convolutions 616a, 616b, 616c and 616d. This is done by block multiplying convolutions 616b, 616c and 616d by a complex exponential having a value of the sine wave of the frequency determined above at the location of the peak. Then convolutions 616a, 616b, 616c and 616d are averaged. In this case, summing of convolutions 616a, 616b, 616c and 616d is performed prior to calculating the magnitude. This is possible due to the coherent nature of the processing.

Figure 7:
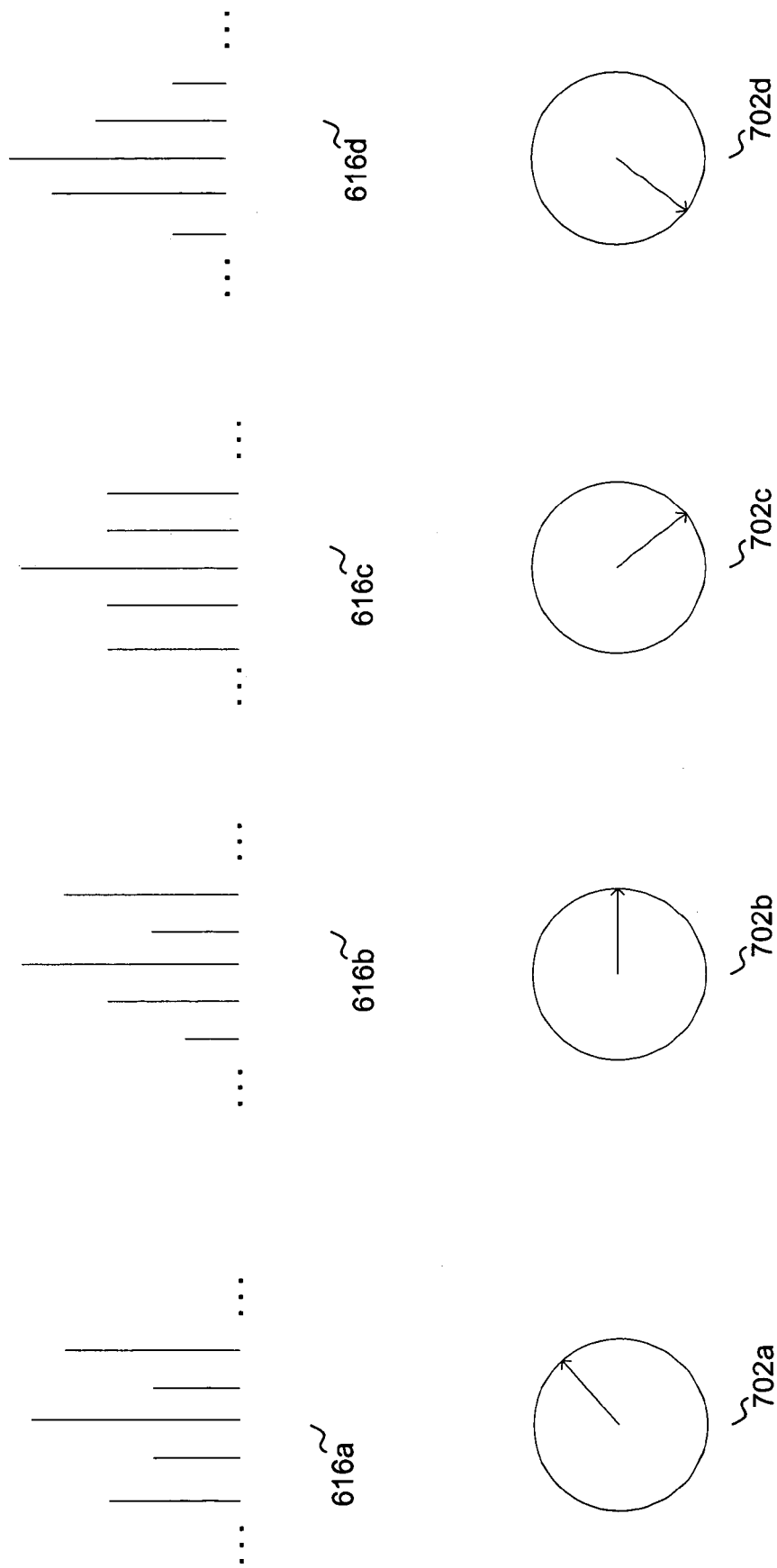
FIG. 7 illustrates coherent processing in accordance with the present invention.

FIG. 7 illustrates coherent processing in this fashion described above. Exemplary portions of convolutions 616a, 616b, 616c and 616d where the coarse convolution indicates the Gold code best aligns with the input signal for each millisecond of the input signal. These are peaks 701a, 701b, 701c and 701d. The phase associated with each peak is illustrated in phase representations 702a, 702b, 702c and 702d respectively. If the carrier frequency of the input signal and the frequency of the locally generated Gold code were exactly matched, each of phase representations 702a, 702b, 702c and 702d would be identical.

However, as shown in FIG. 7, there is a rotation in the phase as time progresses, i.e., from convolution segment to convolution segment. The rate of rotation of this phase corresponds to the frequency offset between the carrier frequency of the input signal and the frequency of the locally generated Gold code. This frequency offset is estimated by, for example, taking an FFT, as described above. Arbitrarily, the phase of vector 702a is chosen as the reference. Using the frequency offset calculated above, the phase at the time of the peak for each of convolutions 616b, 616c and 616d is determined. The difference between this phase and the reference is the amount of rotation to apply to the respective convolution product to enable coherent averaging. The phase is applied by complex block multiplying the convolution segment with a complex exponential having a phase equal to the phase difference, from the reference.

Further efficiency can be obtained by only processing the peak and one or a few more points on either side of the peak, rather than the entire 1-ms sample. Using only a few points is significantly faster than applying the process to all 1024 points. In the ensuing discussion, only 5 points (2 points on either side of the estimated peak location and the point of the estimated peak location) are used. It should be noted, however, that any number of points surrounding, and including, the estimated peak location can be used.

After applying the rotation to the 5 points, a peak detection is performed to more accurately determine the code phase. There are many techniques for determining the peak. For example, curve-fitting techniques such as a parabolic fit, can be used to determine where the peak is given the points.

Alternatively, a table lookup method is employed. In this method the Gold code is convolved with a perfect input signal at varying offsets, preferably over a chip length. Preferably, the offsets are varied uniformly over the chip length. Though any number of points could be used, for example, only 5 points may be used for computational efficiency. Any number of offsets can be used. For example, if 64 offsets are used, then the first set of values corresponds to perfect alignment of the Gold code and input signal. The second set of values in the table corresponds to a misalignment of $1/64^{th}$ of a chip length between the Gold code and the input signal. The table is preferably pre-computed and stored in non-volatile memory, as described above for the FFT of the Gold code.

Figure 8:
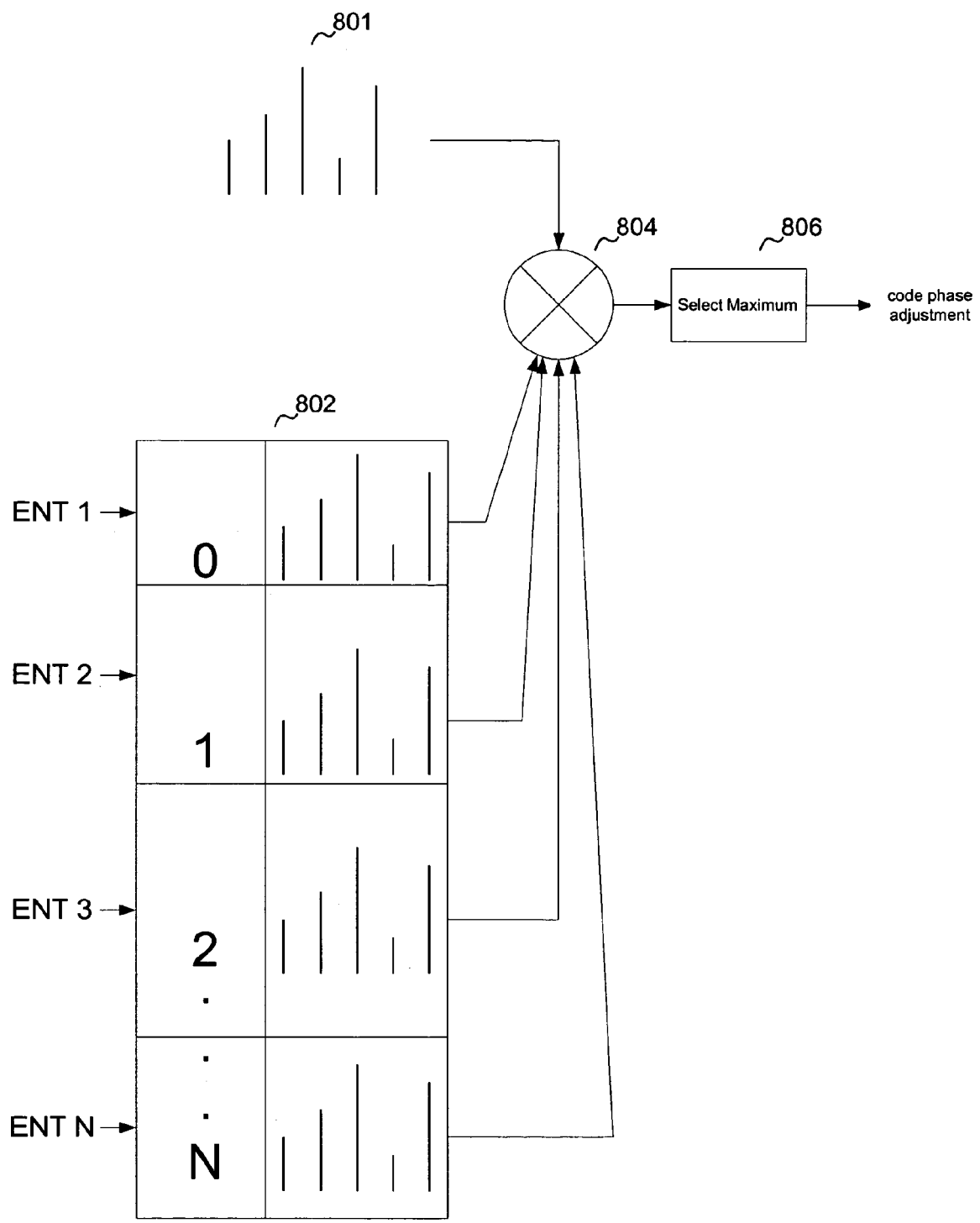
FIG. 8 illustrates the use of a table that stores pre-computed timing offsets of the input signal relative to the Gold code.

FIG. 8 illustrates a schematic for using a table 802 that stores pre-computed timing offsets of the input signal relative to the Gold code. The rotated 5 points in the vicinity of the peak 801 are correlated with each entry ENT 1, ENT 2 through ENT N in table 802 using correlator 804. The maximum correlation is chosen as the correct value of the code phase by maximum value selector 806. It is used to adjust the coarse code phase determined above from the magnitude and sum of convolutions 616a, 616b, 616c and 616d.

Because the detection of the coarse estimate of the code phase and frequency is more computationally demanding than the interpolation required to fine-tune the estimates, the present invention can be further optimized. This is because less data (for example 4 or 8 milliseconds) should be used in the initial step of determine coarse frequency and code phase due to the longer processing time requirements, while more data (for example 16 milliseconds) can be used in fine-tuning the frequency and code phase due to the shorter processing time requirements. However, it would be possible to apply the foregoing techniques to any amount of data.

A variation of the present invention can be used where the SNR of the received signal is very low, for example, where the GPS receiver is in a building or other structure. In this case, the SNR may be too low to perform the non-coherent averaging technique to determine coarse frequency and code phase. What is required in this case is the ability to do coherent averaging to determine code phase and frequency.

In this variation, processing is as described above to produce convolutions 616a, 616b, 616c and 616d. Then the coherent processing described above with respect to FIG. 7 is perform on each point in convolutions 616a, 616b, 616c and 616d. Thus, rather than just performing the coherent processing once at the coarse peak location, the coherent processing is performed 1024 times (or however large the convolution size is). The resulting values are then compared to determine where the peak is. Once a peak location is determined, the peak location is refined as described above using curve fitting techniques or lookup tables.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for detecting code phase and carrier frequency in a GPS signal comprising:
   a. collecting a multiple millisecond portion of a GPS signal in a GPS receiver;
   b. performing a coarse acquisition of a carrier frequency and code phase of the GPS signal using non-coherent processing, wherein said non-coherent processing includes:
      i. partitioning the multiple millisecond portion of the GPS signal into one millisecond segments, converting each one millisecond segment to the frequency domain;
      ii. multiplying each of the converted millisecond segments by a frequency representation of a Gold code corresponding to a GPS satellite in view of the GPS receiver to generate a product;
      iii. converting each product to the time domain to obtain a correlation signal between each millisecond segment and the Gold code; and
      iv. determining a location of a peak in each correlation signal; and
   c. performing a fine acquisition of said carrier frequency and code phase of the GPS signal using coherent processing.

2. The method of claim 1, wherein said performing a fine acquisition comprises using a curve fitting routine to refine the location of the peak.

3. The method of claim 1, wherein said performing a fine acquisition comprises using a table lookup method.

4. The method of claim 1, wherein said performing a fine acquisition comprises analyzing complex values at locations of said determined peaks.

5. The method of claim 4, wherein said performing a fine acquisition comprises analyzing complex values of said determined peaks and a few points on either side of said determined peaks.

6. The method of claim 1, further comprising the steps of:
pre-computing the frequency representation of the Gold code; and
storing the pre-computed frequency representation of the Gold code in memory.

* * * * *